US009651654B2

(12) United States Patent
Lin et al.

(10) Patent No.: US 9,651,654 B2
(45) Date of Patent: May 16, 2017

(54) CORRECTING DEVICE ERROR RADIUS ESTIMATES IN POSITIONING SYSTEMS

(75) Inventors: Jyh-Han Lin, Mercer Island, WA (US);
Yong Song, Kenmore, WA (US);
Stephen P. DiAcetis, Duvall, WA (US);
Julia Maureen Letchner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1204 days.

(21) Appl. No.: 13/530,648

(22) Filed: Jun. 22, 2012

(65) Prior Publication Data
US 2013/0342401 A1 Dec. 26, 2013

(51) Int. Cl.
*G01S 3/02* (2006.01)
*G01S 5/02* (2010.01)
*G01S 1/00* (2006.01)

(52) U.S. Cl.
CPC .......... *G01S 5/0252* (2013.01); *G01S 5/0278* (2013.01); *G01S 1/00* (2013.01); *G01S 5/021* (2013.01); *G01S 5/0242* (2013.01)

(58) Field of Classification Search
CPC ...... G01S 5/021; G01S 5/0242; G01S 5/0252; G01S 5/0278; G01S 1/00
USPC ...... 342/386, 450, 451, 463, 464; 455/456.1
See application file for complete search history.

(56) References Cited

U.S. PATENT DOCUMENTS

| | | |
|---|---|---|
| 5,740,048 A | 4/1998 | Abel et al. |
| 6,947,734 B1 * | 9/2005 | Toubassi .................. G01S 5/021 342/420 |
| 7,116,988 B2 * | 10/2006 | Dietrich ................ G01S 5/0221 342/450 |
| 7,751,829 B2 * | 7/2010 | Masuoka .............. G01S 5/0294 455/41.2 |
| 8,229,442 B1 * | 7/2012 | Ji .......................... H04W 24/00 455/446 |
| 8,618,984 B2 * | 12/2013 | Lin ........................... G01S 5/02 342/451 |
| 8,665,154 B2 * | 3/2014 | Lin ....................... G01S 5/0252 342/451 |

(Continued)

OTHER PUBLICATIONS

Dong, et al., "Position Estimation with Moving Beacons in Wireless Sensor Networks", Retrieved at <<http://ieeexplore.ieee.org/stamp/stamp.jsp?tp=&arnumber=4224678>>, IEEE Wireless Communications and Networking Conference (WCNC), Mar. 11, 2007, pp. 2319-2323.

(Continued)

*Primary Examiner* — Chuong P Nguyen

(57) ABSTRACT

Embodiments adjust device error radiuses associated with inferred device positions produced by positioning systems. Inferred beacon positions and associated beacon radiuses are accessed for beacons in a beacon fingerprint from an observing computing device. The beacon radiuses are associated with a pre-defined confidence level (e.g., an in-circle percentage). A Kalman filter is applied to at least one of the beacons using the inferred beacon positions and the beacon radiuses associated therewith to infer a device position for the computing device and to compute a device error radius for the inferred device position. The computed device error radius is adjusted as a function of the quantity of beacons input to the Kalman filter to achieve the pre-defined confidence level.

20 Claims, 7 Drawing Sheets

(56) References Cited

U.S. PATENT DOCUMENTS

| | | | |
|---|---|---|---|
| 2007/0093257 A1* | 4/2007 | McDougall | H04W 24/00 455/456.1 |
| 2007/0202887 A1* | 8/2007 | Counts | G01S 5/0252 455/456.1 |
| 2007/0270157 A1* | 11/2007 | Kim | H04W 64/00 455/456.1 |
| 2007/0276590 A1 | 11/2007 | Leonard et al. | |
| 2010/0324813 A1 | 12/2010 | Sundararajan et al. | |
| 2011/0205125 A1 | 8/2011 | Lin et al. | |

OTHER PUBLICATIONS

McCarthy, et al., "Positioning with Independent Ultrasonic Beacons", Retrieved at <<http://www.cs.bris.ac.uk/Publications/Papers/2000430.pdf>>, Sep. 24, 2006, pp. 11.

Hontani, et al., "Kalman Filtering for Improving Car Positioning with Measurements of Relative Distance", Retrieved at <<http://ieeexplore.ieee.org/stamp/stamp.jsp?tp=&arnumber=4421490, SICE Annual Conference, Sep. 17, 2007, pp. 2923-2926.

Alqudah, et al., "On the Effects of Multiple Beacons on Localization for Wireless Sensor Networks", Retrieved at <<http://ieeexplore.ieee.org/stamp/stamp.jsp?arnumber=04547580>>, Wireless Telecommunications Symposium (WTS), Apr. 24, 2008, pp. 304-309.

Maybeck, "Stochastic models, estimation, and control", Chapter 1, vol. 1, Academic Press, 1979, 19 pages.

* cited by examiner

CORRECTING DEVICE ERROR RADIUS ESTIMATES IN POSITIONING SYSTEMS

BACKGROUND

There are many ways to determine a position of a device. For example, some existing positioning systems such as global positioning systems (GPS) use satellites, while other systems such as collaborative positioning systems determine the position of the device based on crowd-sourced data (e.g., previously received positioned observations). Beacon positions, also estimated from crowd-sourced observation data, are used to estimate the position of the device that requests position information based on an observed list of beacons (e.g., a beacon fingerprint). The complexity and accuracy of the estimated device position depends in part on the data describing the beacons selected as input to the positioning system.

For example, it is difficult to accurately estimate a beacon radius, such as when there are few observations for a particular beacon. The estimated beacon radius may not reflect the actual beacon radius for a given confidence level (e.g., 90%, 95%, etc.). When one of the positioning systems attempts to infer a device position and device error radius associated with the inferred device position using such potentially inaccurate beacon radius estimates, the resulting device error radius may also be inaccurate.

SUMMARY

Embodiments of the disclosure adjust computed device error radiuses associated with inferred device positions. Data representing a set of beacons observed by a computing device is received. Beacon reference data is accessed to infer a beacon position for each of the beacons in the set of beacons and to determine a minimum beacon radius for each of the inferred beacon positions to achieve a pre-defined confidence level. A Kalman filter is applied to one or more of the beacons using the inferred beacon positions and the determined minimum beacon radiuses for the one or more of the beacons. Applying the Kalman filter infers a device position for the computing device and computes a device error radius for the inferred device position. The computed device error radius is adjusted as a function of a quantity of the one or more of the beacons input to the Kalman filter to achieve the pre-defined confidence level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
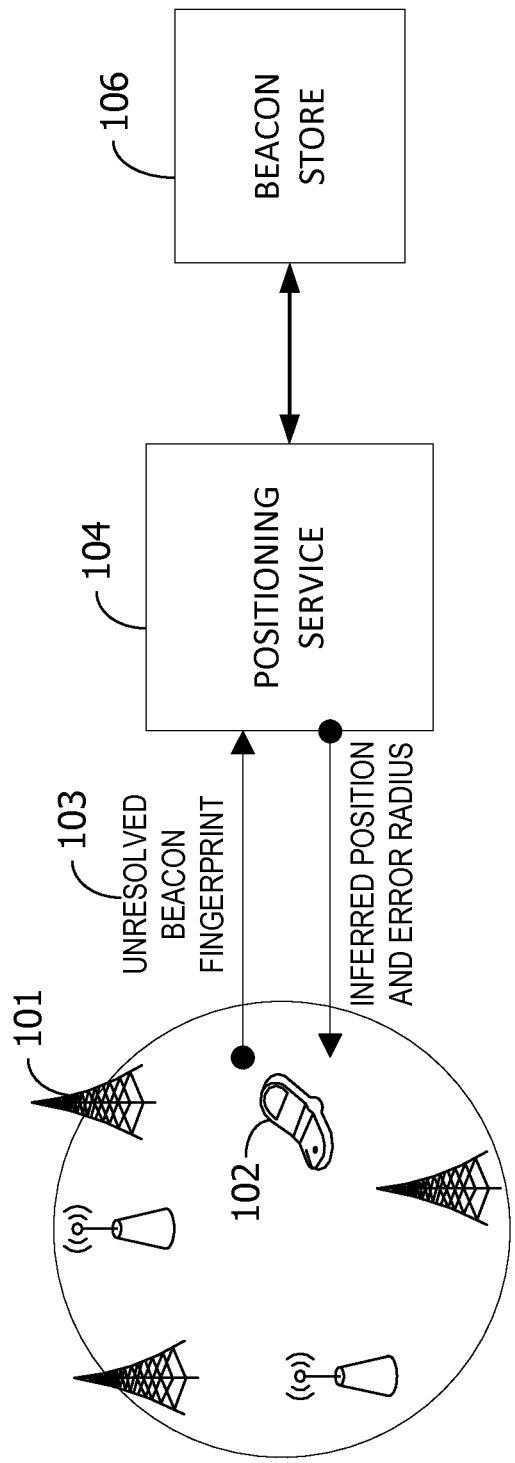
FIG. 1 is an exemplary block diagram illustrating receipt of a beacon fingerprint from a mobile computing device and calculation of a location for the mobile computing device based on the beacon fingerprint.

Referring to the figures, embodiments of the disclosure provide a statistically more accurate device error radius estimate to indicate a true position of a user around an inferred device position. The more accurate device error radius estimate improves the user experience such as when the user is seeking recommendations about nearby attractions, checking into a particular location, etc.

Some embodiments estimate beacon positions and beacon radiuses for a plurality of beacons 101. Aspects of the disclosure adjust the estimated beacon radiuses, based in part on previously received positioned observations 208, to more accurately reflect actual beacon radiuses. A positioning system, or other computing device 202, applies a Kalman filter to a beacon fingerprint 103 (e.g., set of beacons 101 observed by an observing computing device) using the estimated beacon positions and adjusted beacon radiuses to produce an inferred device position and associated device error radius. The device error radius is then adjusted to achieve a pre-defined confidence level. For example, the pre-defined confidence level, precision, or other confidence of inference may include a percentage within a circle having the estimated device error radius as its radius. As a result, if a particular beacon 101 is detected with a given confidence level, aspects of the disclosure produce an inferred device position that is within a circle centered at the estimated beacon position with the estimated beacon radius.

While some embodiments are described herein with reference to application of a Kalman filter, aspects of the disclosure are operable with other means for taking, as input, measurements of a value observed over time that have random variations (e.g., noise and other inaccuracies) and producing, as output, measurements that tend to be closer to the value.

Some embodiments of the disclosure are operable in environments in which a position is calculated for a computing device based on one or more beacons 101 observed by the computing device. For example, referring next to FIG. 1, an exemplary block diagram illustrates receipt of the beacon fingerprint 103 from a mobile computing device 102 and calculation of a position and error radius for the mobile computing device 102 based on the beacon fingerprint 103. The system illustrated in FIG. 1 represents an example of a position inference system, positioning system, or other positioning service 104 in accordance with aspects of the disclosure. However, other systems, elements, and configurations are contemplated and within the scope of embodiments of the disclosure.

In the example of FIG. 1, the mobile computing device 102 (e.g., a mobile telephone) detects or observes one or more beacons 101 including cellular towers (or sectors if directional antennas are employed) and wireless fidelity (Wi-Fi) access points or other access points (APs). The beacons 101 detected by the mobile computing device 102 at a given point in time represent the beacon fingerprint 103. The beacon fingerprint 103 may also include other attributes of the detection such as signal strength, date and time of observation, etc. While aspects of the disclosure may be described with reference to beacons 101 implementing protocols such as the 802.11 family of protocols, embodiments of the disclosure are operable with any beacon 101 for wireless communication.

The positioning service 104 receives the beacon fingerprint 103 from the mobile computing device 102. The positioning service 104 stores, or has access to, data describing the approximate location of one or more of the beacons 101 in the beacon fingerprint 103. The data is referred to as beacon reference data 305 and describes, for example, the longitude, latitude, and/or altitude of many beacons 101. In some embodiments, the beacon reference data 305 is stored in a beacon store 106. The beacon reference data 305 may be derived from crowd-sourced positioned observations 208, such as those described below with reference to FIG. 2.

In the example of FIG. 1, the positioning service 104 accesses the beacon reference data 305 stored in the beacon store 106 and predicts or otherwise infers the position of observation associated with the received, unresolved beacon fingerprint 103. For example, as further described below, the positioning service 104 infers the position of the mobile computing device 102 using the approximate location of at least one of the beacons 101 in the beacon fingerprint 103 along with the error radius. The inferred or predicted position and error radius is then provided to the mobile computing device 102 as the inferred position of the mobile computing device 102.

While the beacon store 106 is shown as separate from the positioning service 104 in FIG. 1, at least a portion of the data from the beacon store 106 may be stored, alternatively or in addition, with the positioning service 104 itself. For example, FIG. 2 as next described illustrates a plurality of positioned observations 208 being stored with the computing device 202 implementing operations associated with the positioning service 104.

Further, while the mobile computing device 102 is shown as separate from both the positioning service 104 and the beacon store 106 in FIG. 1, one or more of the operations associated with the positioning service 104 may be performed by the mobile computing device 102 and at least a portion of the data from the beacon store 106 may be stored with the mobile computing device 102. For example, the mobile computing device 102 may execute operations to observe one or more beacons 101, infer a device position based on the observed beacons 101 and data from the beacon store 106, and calculate and adjust a device error radius associated with the inferred device position, such as described herein.

Figure 2:
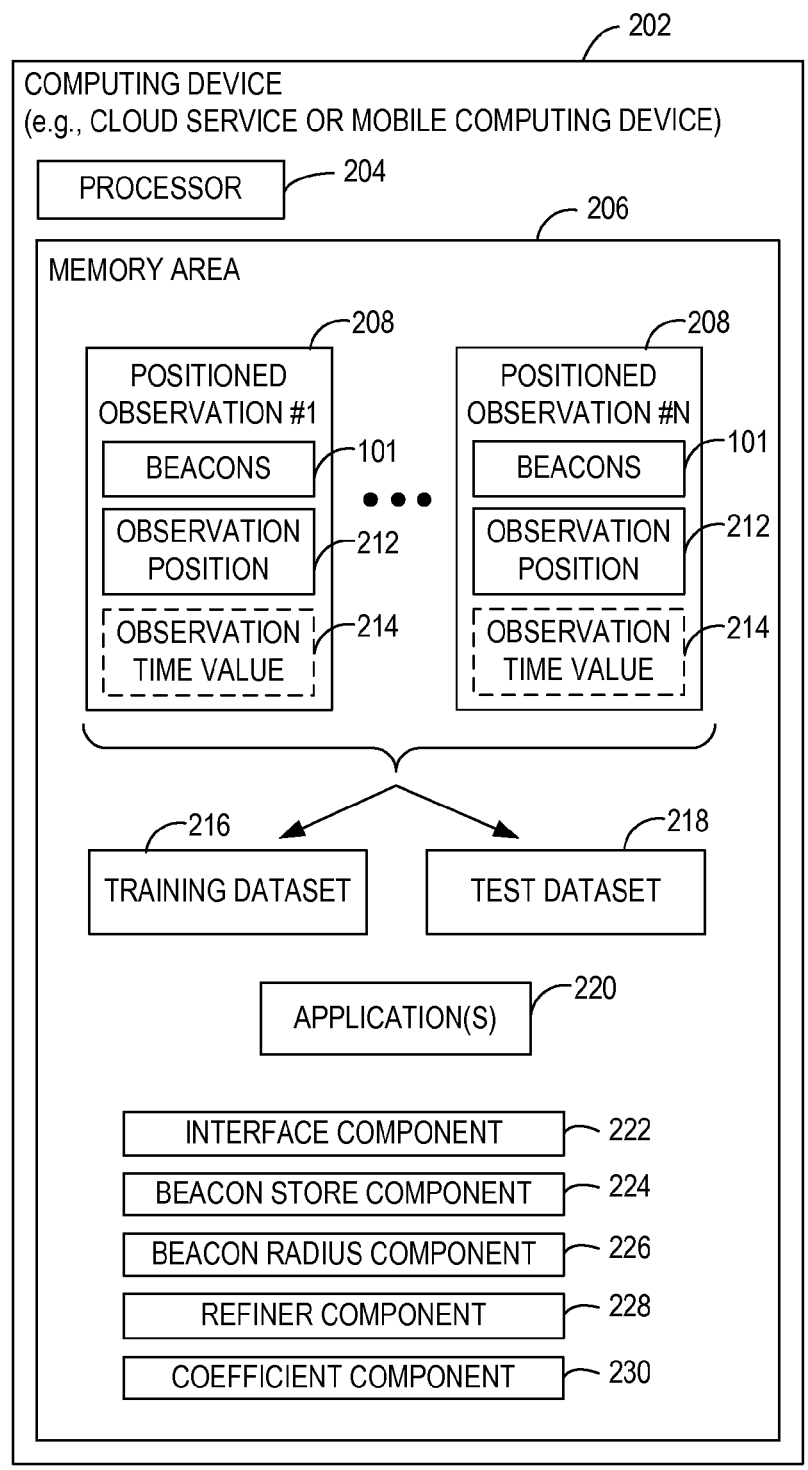
FIG. 2 is an exemplary block diagram illustrating a computing device such as in a positioning service for inferring device positions and error radiuses.

Referring next to FIG. 2, an exemplary block diagram illustrates the computing device 202 associated with the positioning service 104 implementing operations to infer a device position and compute a device error radius associated with the inferred device position. In some embodiments, such as illustrated and described with reference to FIG. 3 and FIG. 6 below, the computing device 202 adjusts the computed device error radius to achieve a desired, pre-defined, or pre-selected confidence level.

The computing device 202 represents any device executing instructions (e.g., as application programs, operating system functionality, or both) to implement the operations and functionality associated with the computing device 202. The computing device 202 may include the mobile computing device 102 or any other portable device. In some embodiments, the mobile computing device 102 includes a mobile telephone, laptop, tablet, computing pad, netbook, gaming device, and/or portable media player. The computing device 202 may also include less portable devices such as desktop personal computers, kiosks, and tabletop devices. Additionally, the computing device 202 may represent a group of processing units or other computing devices such as in a cloud service (e.g., see FIG. 1).

In some embodiments, the computing device 202 has at least one processor 204 and a memory area 206. The processor 204 includes any quantity of processing units, and is programmed to execute computer-executable instructions for implementing aspects of the disclosure. The instructions may be performed by the processor 204 or by multiple processors executing within the computing device 202, or performed by a processor external to the computing device 202. In some embodiments, the processor 204 is programmed to execute instructions such as those illustrated in the figures (e.g., FIG. 3 and FIG. 6).

In some embodiments, the processor 204 represents an implementation of analog techniques to perform the operations described herein. For example, the operations may be performed by an analog computing device and/or a digital computing device.

The computing device 202 further has one or more computer readable media such as the memory area 206. The memory area 206 includes any quantity of media associated with or accessible by the computing device 202. The memory area 206 may be internal to the computing device 202 (as shown in FIG. 2), external to the computing device 202 (not shown), or both (not shown). In some embodiments, the memory area 206 includes read-only memory and/or memory wired into an analog computing device.

The memory area 206 stores, among other data, one or more applications 220. The applications 220, when executed by the processor 204, operate to perform functionality on the computing device 202. Exemplary applications 220 include mail application programs, web browsers, calendar application programs, address book application programs, messaging programs, media applications, location-based services, search programs, and the like. The applications 220 may communicate with counterpart applications or services such as web services accessible via a network. For example, the applications 220 may represent downloaded client-side applications that correspond to server-side services executing in a cloud.

The memory area 206 further stores, among other data, one or more positioned observations 208 such as positioned observation #1 through positioned observation #N. Each of the positioned observations 208 includes at least a set of one or more beacons 101. In the example of FIG. 2, each of the positioned observations 208 further includes an observation position 212. Each of the positioned observations 208 may further include other values, such an observation time value 214 and/or other properties describing the observed beacons 101 and/or the observing computing device. An exemplary observation position 212 may include values for a latitude, longitude, and altitude of the observing computing device. For example, the observation position 212 associated with the observing computing device may be determined via a global positioning system (GPS) receiver associated with the observing computing device.

The computing device 202 (e.g., a cloud service) may receive the positioned observations 208 directly from one or more of the observing computing devices (e.g., crowd-sourced). Alternatively or in addition, the computing device 202 may retrieve, access, or otherwise benefit from, one or more of the positioned observations 208 from another storage area such as the beacon store 106. In such embodiments, the observing computing devices transmit, via a network, the positioned observations 208 to the beacon store 106 for access by the computing device 202 (and possibly other devices as well). The network includes any means for communication between the observing computing devices and the beacon store 106 and/or the positioning service 104.

As described herein, aspects of the disclosure operate to divide, separate, construct, assign, or otherwise create a training dataset 216 and a test dataset 218 from the positioned observations 208. The training dataset 216 includes training positioned observations while the test dataset 218 includes test positioned observations. In some embodiments, the training dataset 216 is used to construct a beacon model 506 (e.g., inferred beacon positions for the beacons 101) while the test dataset 218 and the beacon model 506 are used to generate beacon radiuses associated with the inferred beacon positions (e.g., one beacon 101 at a time for inferring positions for the observations in the test dataset 218).

The memory area 206 further stores one or more computer-executable components. Exemplary components include an interface component 222, a beacon store component 224, a beacon radius component 226, a refiner component 228, and a coefficient component 230. Operation of these components, when executed by the computing device 202, is described below with reference to FIG. 3.

Figure 3:
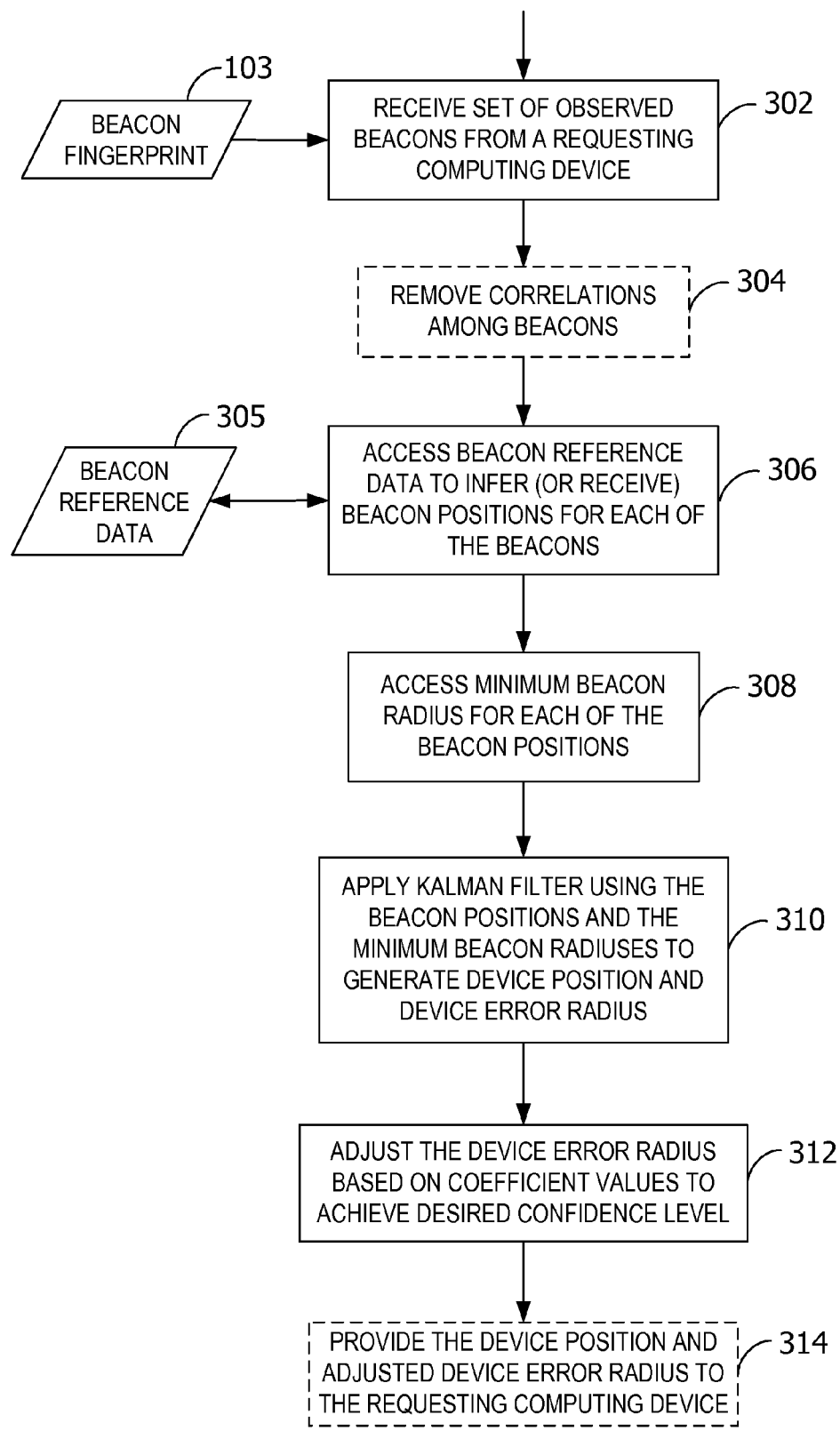
FIG. 3 is an exemplary flow chart illustrating operation of the computing device in FIG. 2 to adjust a device error radius computed from application of a Kalman filter.

Referring next to FIG. 3, an exemplary flow chart illustrates operation of the computing device 202 in FIG. 2 to adjust a device error radius computed from execution of a Kalman filter inference algorithm. While the operations illustrated in FIG. 3 are executed by the computing device 202 (e.g., the positioning service 104 and/or the mobile computing device 102) in some embodiments, aspects of the disclosure are operable with other entities executing one or more of the operations. For example, one or more of the operations may be executed by a server remote from the computing device 202 yet in communication with the computing device 202. For convenience, the operations illustrated in FIG. 3 are next described as being executed by the positioning service 104.

At 302, the positioning service 104 receives data representing a set of beacons 101 (e.g., the beacon fingerprint 103) from a requesting or observing computing device. The requesting computing device includes, for example, the mobile computing device 102 illustrated in FIG. 1. At 304, the positioning service 104 optionally filters or otherwise processes the received set of beacons 101 to remove highly correlated (e.g., duplicate) beacons 101 having substantially the same inferred or refined positions. For example, some of the observations at different time may be correlated to some degree (e.g., the paths of observation may be constrained by asymmetric roads or a small group of users, or when the observation count of a beacon 101 is small). Removing the correlated beacons 101 avoids biasing towards the correlated beacon positions during application of the Kalman filter and avoids under-estimating the error radius of inferred device positions. In some embodiments, the positioning service 104 considers those beacons 101 having the same latitude, longitude, and radius in the received beacon fingerprint 103 to be the same beacon 101 when applying the Kalman filter. For example, the positioning service 104 may iterate through the beacons 101 identified in the received set of beacons 101 to create a dictionary or other data store. Beacons 101 are added to the dictionary when no other beacon 101 in the dictionary has substantially the same position and radius values as the beacon 101 being evaluated.

At 306, the positioning service 104 accesses the beacon reference data 305 to infer a beacon position for each of the beacons 101 in the received set of beacons 101. Alternatively or in addition, the positioning service 104 may receive one or more of the beacon positions as part of the beacon reference data 305.

At 308, the positioning service 104 accesses a minimum beacon radius calculated for each of the inferred beacon positions that achieves a pre-defined confidence level. For example, the positioning service 104 may access the beacon reference data 305 to obtain beacon radiuses pre-computed using experimental results. The beacon radiuses may be computed periodically, such as daily. In other embodiments, the positioning service 104 may calculate the beacon radiuses on demand in response to receiving the set of observed beacons 101 from the requesting computing device (e.g., an inference request).

An exemplary pre-defined confidence level includes, but is not limited to, 95%. For example, the minimum beacon radius may be selected by finding 95% of the maximum distance of observations to the centroid (e.g., median position), and then using the minimum radius setting obtained from a minimum beacon radius setting table. The minimum beacon radius setting table is obtained from experimental analytics. The lookup of the minimum radius setting in the table is based on the observation count used to refine the position of the beacon 101. When the beacon 101 has more observations available for refining, there is more data and confidence on the beacon radius estimation and hence the minimum beacon radius may be reduced.

The minimum beacon radius setting table identifies estimated minimum beacon radius settings for different observation counts (e.g., observation counts used for refining beacon position) by, for example, measuring the observation distance to the published beacon position. Exemplary operations for populating the minimum beacon radius setting table include:

separating the positioned observations 208 into the training dataset 216 and the test dataset 218;

refining the training dataset 216 to construct the beacon models 506 (e.g., inferred beacon positions including latitude and longitude, and total observations);

using the test dataset 218 and based on the beacon models 506, calculate one or more of the following values for each observation of the beacons 101: beacon latitude, beacon longitude, observation latitude, observation longitude, total observation count, beacon radius, measurement count, and in-circle count;

calculate a distance between beacon observation and beacon position;

calculate error radius and error distance histogram after grouping the data by observation count (and observation date); and populate the minimum beacon radius setting table by analyzing the calculated error distance and error radius.

Analyzing the calculated error distance and error radius values includes, for example, relating error distances at a 67% confidence level, 90% confidence level, and 95% confidence level to an observation count per beacon 101.

Exemplary operations for calculating the minimum beacon radius for one of the beacons 101 include:

calculating a beacon position (e.g., median position, or centroid) based on a set of training positioned observations for the beacon 101; and calculate distances from each of the test positioned observations to the calculated beacon position.

An exemplary minimum beacon radius setting table is shown below in Table 1 that achieves a 95% in-circle confidence level. Aspects of the disclosure are operable, however, with other minimum beacon radius values and observation counts.

TABLE 1

Exemplary Minimum Beacon Radiuses Relative to Observation Counts.

| Observation Count | Minimum Beacon Radius (meter) |
|---|---|
| 1 | 290 |
| 2-3 | 210 |
| 4-7 | 185 |
| 8-15 | 155 |
| 16-31 | 130 |
| 32+ | 100 |

At 310, the positioning service 104 applies a Kalman filter to one or more of the beacons 101 from the received set of beacons 101. In some embodiments, the Kalman filter is applied to a subset of the beacons 101 from the beacon fingerprint 103 while in other embodiments, the Kalman filter is applied to each of the beacons 101 from the beacon fingerprint 103. For example, the subset may be selected by eliminating outlier beacons 101, and/or performing other filtering of the beacons 101. Further description of the Kalman filter inference algorithm is described below with reference to FIG. 4.

The inferred beacon positions and the determined minimum beacon radiuses of the one or more beacons 101 act as input to the Kalman filter. The output of the Kalman filter is an inferred device position for the requesting computing device along with a computed device error radius associated with the inferred device position.

At 312, the positioning service 104 adjusts the computed device error radius as a function of a quantity or number of the beacons 101 input to the Kalman filter (e.g., the one or more beacons 101 from the received set of beacons 101). For example, the device error radius computed from the Kalman filter decreases quickly as more beacons 101 are used as input to the Kalman filter, to the point where the computed device error radius is no longer accurate. The in-circle percentages (e.g., where a test positioned observation is within the estimated error radius) are thus likely to be less than the desired confidence level.

As such, aspects of the disclosure operate to adjust the device error radius (e.g., increase the circle) by a constant to achieve the desired or pre-defined confidence level. In some embodiments, adjusting the computed device error radius includes accessing a coefficient table 609 such as an error radius adjustment coefficient table. The coefficient table 609 includes a plurality of adjustment coefficient values. The positioning service 104 selects an adjustment coefficient value from the coefficient table 609 as a function of the quantity of beacons 101 input to the Kalman filter (e.g., the quantity of beacons 101 input to the Kalman filter may be used as an index to look up the coefficient value from the coefficient table 609). The selected adjustment coefficient is applied to the computed device error radius by, for example, multiplying the selected adjustment coefficient with the computed device error radius.

The coefficient table 609 may be generated in several ways. For example, the adjustment coefficient values may be computed from the beacon reference data 305. In such an example, the beacon reference data 305 is partitioned into the training dataset 216 and the test dataset 218. A beacon model 506 is constructed for each of the beacons 101 (e.g., in the beacon reference data 305 and/or in the beacon fingerprint 103) using the training dataset 216. Constructing the beacon models 506 includes inferring the beacon positions.

The test dataset 218 is tested against to the constructed beacon models 506 to derive the coefficient values used to populate the coefficient table 609. For example, running the test dataset 218 against the beacon model 506 produces a set of error distances. The set of error distances may be partitioned by the quantity of beacons 101 used for inference. For each of the error distances, coefficient values are iteratively selected and applied until the desired in-circle percentages have been obtained (e.g., 95%). For example, the coefficient values may be selected via binary search with each iteration.

An exemplary coefficient table 609 is shown below in Table 2 that achieves a 95% in-circle confidence level. Aspects of the disclosure are operable, however, with other adjustment coefficient values and beacon counts.

TABLE 2

Exemplary Coefficients Relative to Beacon Count Input to Kalman Filter.

| Beacon Count | Adjustment Coefficient Value |
|---|---|
| 1 | 1.15 |
| 2 | 1.08 |
| 3 | 1.12 |
| 4 | 1.17 |
| 5 | 1.25 |
| 6 | 1.35 |
| 7 | 1.46 |
| 8 | 1.56 |

At 314, the positioning service 104 provides the inferred device position and the adjusted device error radius to the requesting computing device by, for example, sending a message to the computing device.

In some embodiments, the computer-executable components illustrated in FIG. 2 execute to perform one or more of the operations illustrated in FIG. 3. For example, the interface component 222, when executed by at least one processor 204 of the computing device 202, causes the processor 204 to receive data representing a set of beacons 101 observed by a requesting computing device. The beacon store component 224, when executed by at least one processor 204 of the computing device 202, causes the processor 204 to access the beacon reference data 305 to infer (or receive) a beacon position for each of the beacons 101 in the set of beacons 101. The beacon radius component 226, when executed by at least one processor 204 of the computing device 202, causes the processor 204 to determine the minimum beacon radius for each of the inferred beacon positions that achieves a pre-defined confidence level. The refiner component 228, when executed by at least one processor 204 of the computing device 202, causes the processor 204 to apply a Kalman filter to one or more of the beacons 101 using the inferred beacon positions and the determined minimum beacon radiuses associated therewith. Applying the Kalman filter infers a device position for the computing device and computes a device error radius for the inferred device position. The refiner component 228 may further execute to filter the set of beacons 101 to remove correlated beacons 101 having substantially the same inferred beacon positions.

The coefficient component 230, when executed by at least one processor 204 of the computing device 202, causes the processor 204 to adjust the computed device error radius as a function of a quantity of the beacons 101 used as input to the Kalman filter to achieve the pre-defined confidence level. For example, the coefficient component 230 adjusts the computed device error radius by multiplying the computed device error radius by a coefficient value selected as a function of the quantity of the beacons 101 input to the Kalman filter. In some embodiments, the interface component 222 further executes to provide the inferred device position and the adjusted, computed device error radius to the requesting computing device.

Figure 4:
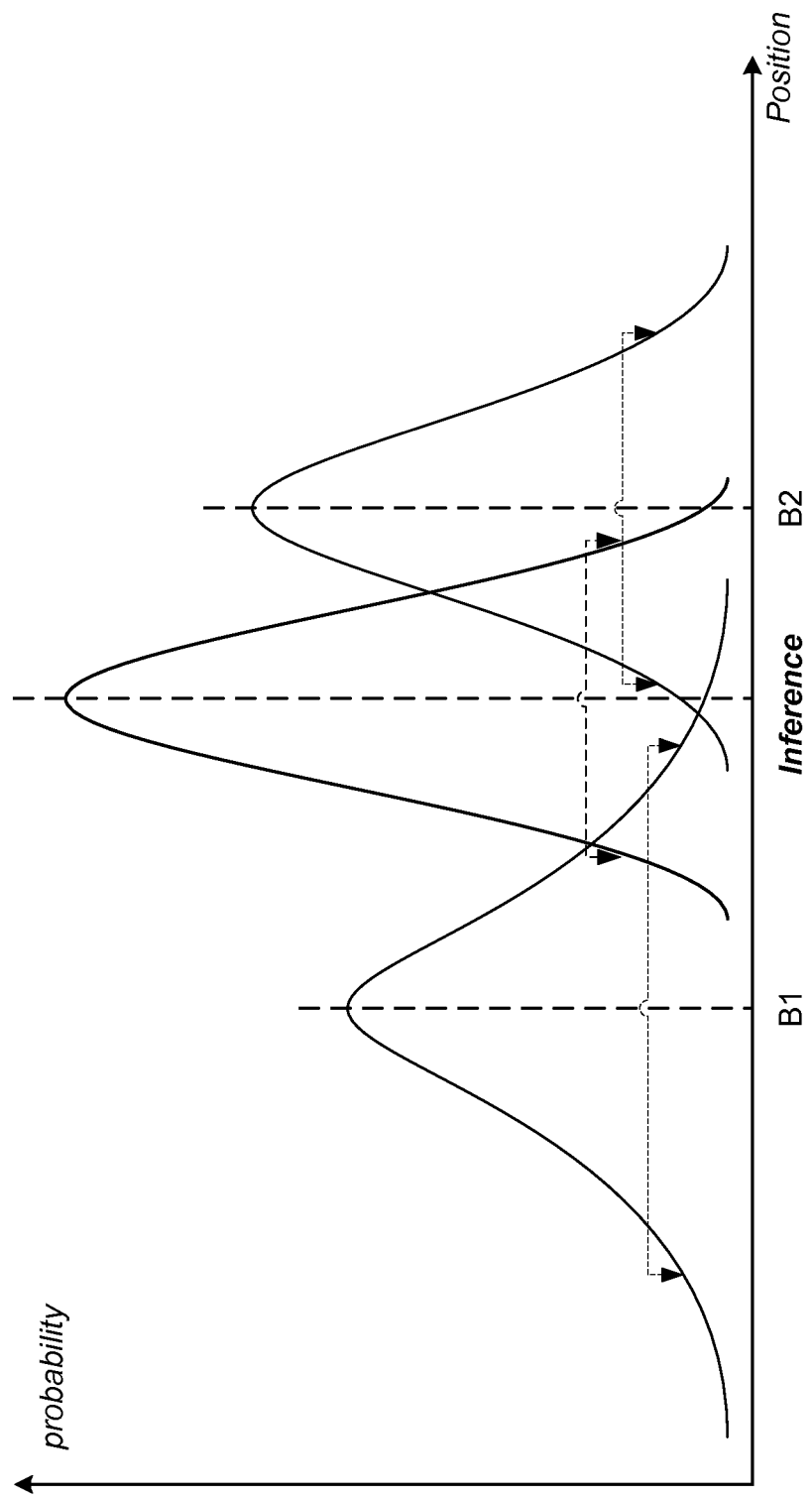
FIG. 4 is an exemplary graph illustrating application of the Kalman filter to combine two measurements.

Referring next to FIG. 4, an exemplary graph illustrates application of the Kalman filter to combine two measurements. An exemplary Kalman filter implementation is next described for embodiments in which observations of the beacons 101 follow a normal distribution. A normal or Gaussian distribution represents a probability distribution to describe random variables that tend to cluster around a mean value. The graph of the probability density function, as shown in FIG. 4, is bell-shaped and referred to as the Gaussian function or bell curve. Observations of a beacon 101 may be approximately characterized as a normal (or Gaussian) distribution around the actual beacon position. That is, the observations of a beacon 101 are considered to be position measurements that may be modeled as white and Gaussian measurement noises overlaid on a computed mean position of the static beacon 101.

A normal distribution is denoted as N ($\mu$, $\sigma^2$) with $\mu$ as the mean and $\sigma$ as the standard deviation. For a normal distribution, a 68.3% error radius corresponds to one standard deviation while a 95% error radius corresponds to two standard deviations.

FIG. 4 illustrates an example graph combining two measurements B1 and B2, each representing a Gaussian curve (e.g., normal distribution), to produce an inference position and error radius (e.g., standard deviation). While the graph illustrates one method of combining two Gaussian curves, aspects of the disclosure are operable with other methods for combining multiple measurements.

The exemplary Kalman filter algorithm uses Equation (1), Equation (2), and Equation (3) below to combine two measurements of a random variable of normal distribution, $N_1(\mu, \sigma^2)$ and $N_2(\acute{\mu}, \acute{\sigma}^2)$, to produce a new normal distribution.

$$\tilde{\mu} = \mu + K(\acute{\mu} - \mu) \quad (1)$$

$$\tilde{\sigma}^2 = \sigma^2(1.0 - K) \quad (2)$$

$$K = \frac{\sigma^2}{\sigma^2 + \acute{\sigma}^2} \quad (3)$$

The output K represents Kalman gain. Standard deviation (e.g., error radius) decreases as more measurements are combined to estimate the variable. The Kalman filter weights each new observation or measurement into the probability distribution of the random variable by the reverse proportion of the square of standard deviation $\sigma^2$. For example, beacon weights for the observations or measurements are defined as shown below in Equation (4).

$$w = \frac{1}{\sigma^2}, \quad (4)$$

$$\acute{w} = \frac{1}{\acute{\sigma}^2},$$

$$\tilde{w} = \frac{1}{\tilde{\sigma}^2}$$

The equivalent formula shown in Equation (5) below may then be deduced.

$$\tilde{\mu} = \mu + \frac{\sigma^2}{\sigma^2 + \acute{\sigma}^2}(\acute{\mu} - \mu) = \frac{\mu w + \acute{\mu}\acute{w}}{w + \acute{w}} \quad (5)$$

Because of the relationship shown below in Equation (6), Equation (7) below is obtained.

$$\tilde{\sigma}^2 = \sigma^2 \left(1.0 - \frac{\sigma^2}{\sigma^2 + \acute{\sigma}^2}\right) = \frac{1}{w + \acute{w}} \quad (6)$$

$$\tilde{w} = w + \acute{w} \quad (7)$$

If there are n beacons 101 where n≥2, the following formulas in Equation (8), Equation (9), and Equation (10) may be deduced.

$$\tilde{\mu} = \frac{\mu_1 w_1 + \mu_2 w_2 + \ldots + \mu_n w_n}{w_1 + w_2 + \ldots + w_n} \quad (8)$$

$$\tilde{w} = w_1 + w_2 + \ldots + w_n \quad (9)$$

$$\tilde{\sigma} = \frac{1}{\sqrt{\tilde{w}}} \quad (10)$$

The beacon weight w may be redefined as shown in Equation (11) below, where R is 95% radius and hence R=2$\sigma$. Solving Equation (11) for R yields Equation (12).

$$w = \frac{1}{R^2} \quad (11)$$

$$\tilde{R} = \frac{1}{\sqrt{\tilde{w}}} \quad (12)$$

While the exemplary Kalman filter implementation is described with reference to the beacon weights identified herein, aspects of the disclosure are operable to combine more information or factors for position and radius estimation.

To combine multiple measurements, the Kalman filter may be applied iteratively. For example, if the beacon fingerprint 103 has four beacons B1, B2, B3, and B4, the positioning service 104 estimates the beacon positions and beacon radiuses by iteratively combining (((B1+B2)+B3)+B4). In some embodiments, the positioning service 104 accesses the beacon reference data 305 to obtain or infer the beacon position and beacon radius for each of the beacons 101 in the beacon fingerprint 103. The positioning service 104 removes the beacons 101 for which no refined position is available (e.g., beacons 101 that have not been observed before), and removes outlier beacons 101. Removing the outlier beacons 101 includes, for example, finding the median position as the centroid, calculating or drawing a circle using a distance threshold setting, and discarding those beacons 101 that lie outside the circle. The remaining beacons 101 are combined, two at a time, using the Kalman filter to compute an inferred beacon position P(x,y) and beacon radius as shown in Equation (13), Equation (14), Equation (15), and Equation (16) (e.g., the Kalman filter algorithm) below.

$$P.x = B1.x + K*(B2.x - B1.x) \quad (13)$$

$$P.y = B1.y + K*(B2.y - B1.y) \quad (14)$$

$$P.\text{radius} = B1.\text{radius} * \sqrt{1.0 - K} \quad (15)$$

$$K = \frac{B1.\text{radius}^2}{B1.\text{radius}^2 + B2.\text{radius}^2} \quad (16)$$

Alternatively, the equations shown above may be optimized to implement the Kalman filter algorithm in a single step.

Figure 5:
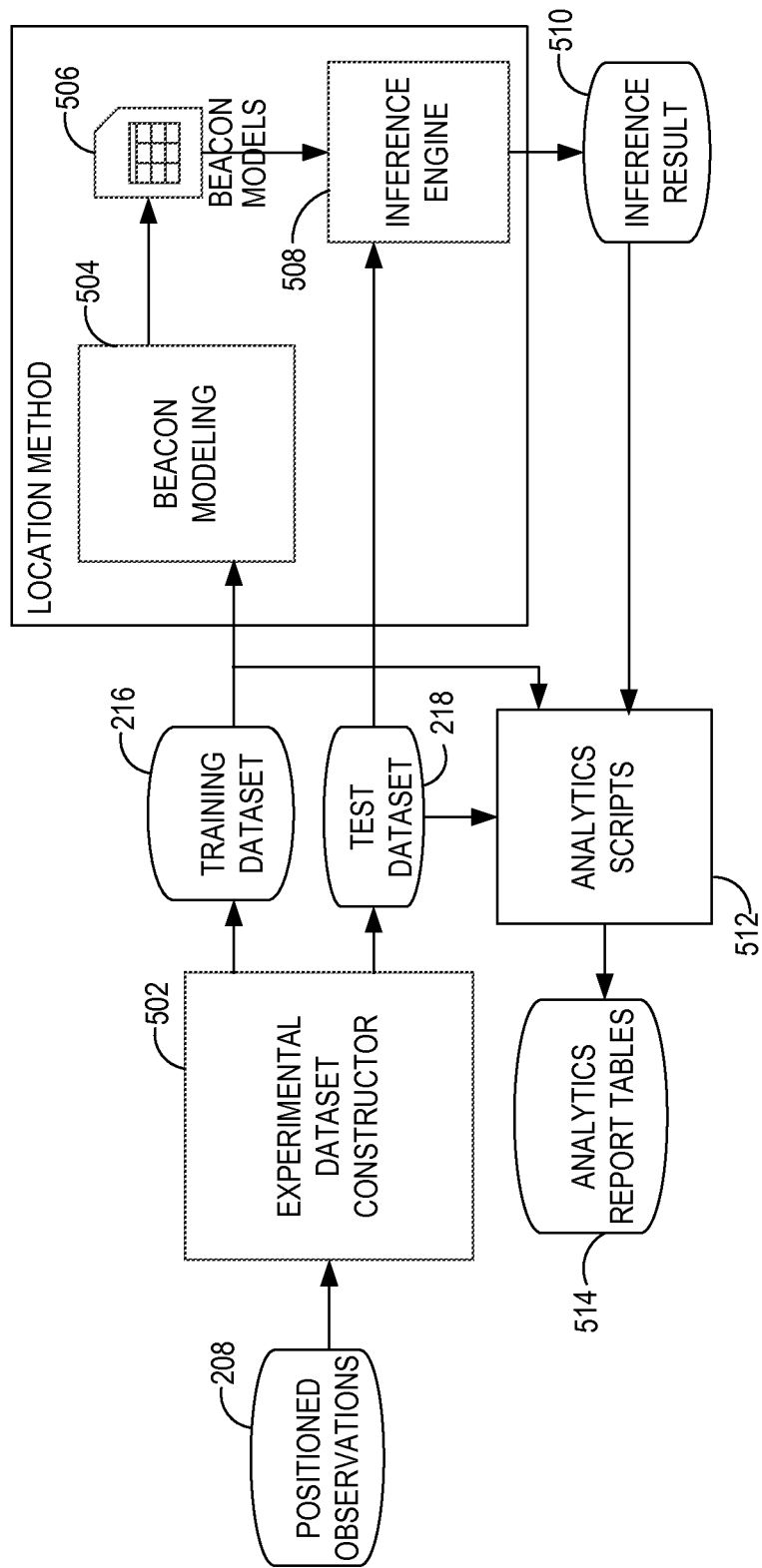
FIG. 5 is an exemplary block diagram illustrating the partitioning of positioned observations into a training dataset (e.g., training positioned observations) and a test dataset (e.g., test positioned observations) for use by positioning services.

Referring next to FIG. 5, an exemplary block diagram illustrates the partitioning of positioned observations 208 into the training dataset 216 (e.g., training positioned observations) and the test dataset 218 (e.g., test positioned observations) for use by the positioning service 104. The training dataset 216 includes training positioned observations, and the test dataset 218 includes test positioned observations. In the example of FIG. 5, an experimental dataset constructor 502 performs the partitioning. In some embodiments, the training dataset 216 and the test dataset 218 are mutually exclusive (e.g., no overlap). In other embodiments, at least one position observation is included in both the training dataset 216 and the test dataset 218. Beacon models 506 are constructed from the training dataset 216 with beacon modeling 504.

An inference engine 508 applies at least one position inference algorithm (e.g., the Kalman filter) to the beacon fingerprints 103 in the test dataset 218 and uses the beacon models 506 to infer corresponding device positions for the test positioned observations in the test dataset 218. Analytics scripts 512 analyze the inference results 510 in view of the training dataset 216 and the test dataset 218 to produce analytic report tables 514 including, for example, calculating the accuracy of the positioning inference algorithm. The analytic report tables 514 further include the beacon radius estimates (e.g., 95% radius of inference using one beacon 101).

Figure 6:
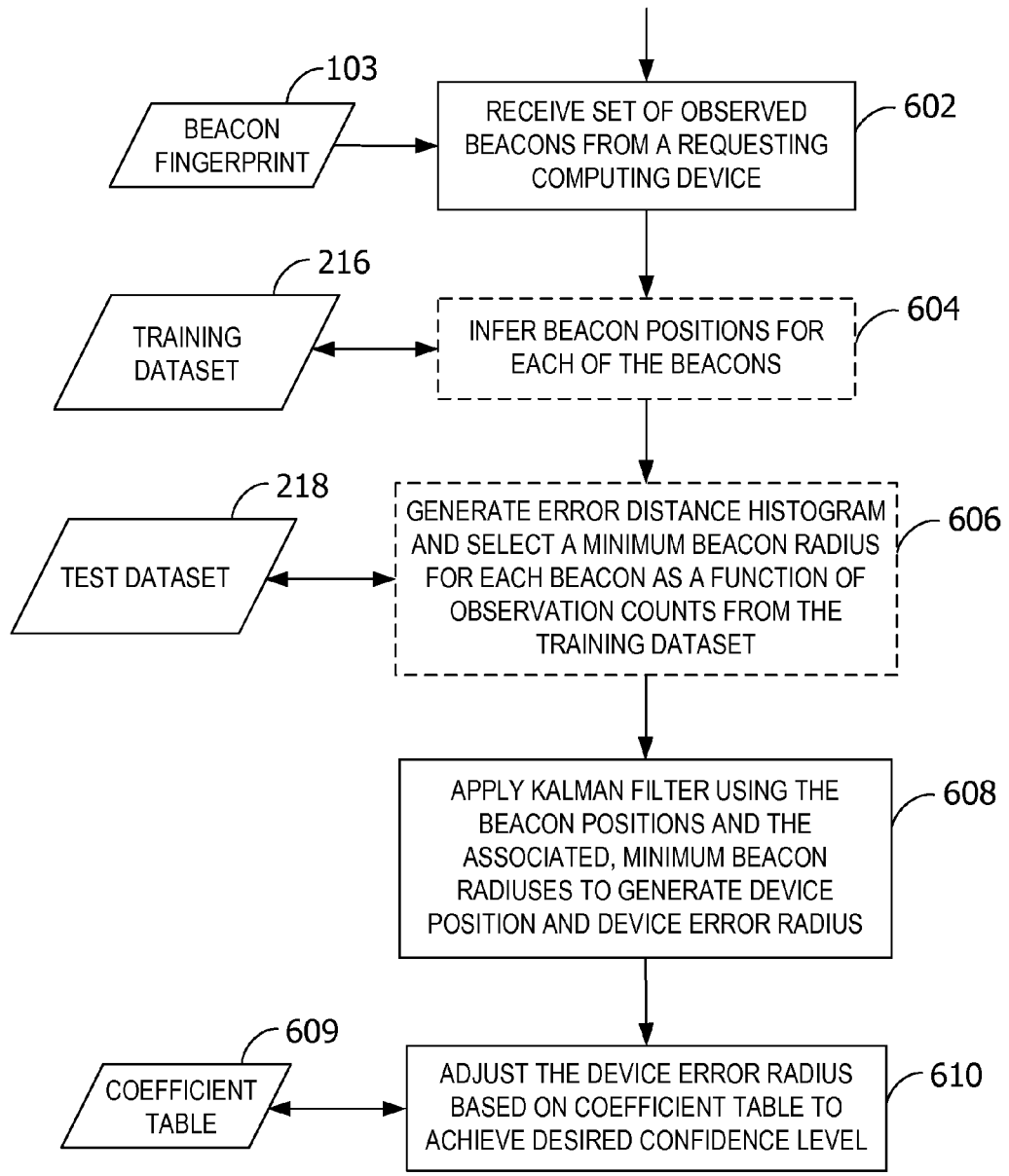
FIG. 6 is an exemplary flow chart illustrating operation of the computing device in FIG. 2 to adjust the input to and output from the Kalman filter using training positioned observations and test positioned observations.

Referring next to FIG. 6, an exemplary flow chart illustrates operation of the computing device 202 in FIG. 2 to adjust the input to and output from the Kalman filter using training positioned observations and test positioned observations. While the operations illustrated in FIG. 6 are executed by the computing device 202 (e.g., the positioning service 104 and/or the mobile computing device 102) in some embodiments, aspects of the disclosure are operable with other entities executing one or more of the operations. For example, one or more of the operations may be executed by a server remote from the computing device 202 yet in communication with the computing device 202. For convenience, the operations illustrated in FIG. 6 are next described as being executed by the positioning service 104.

At 602, the positioning service 104 receives data representing a set of beacons 101 (e.g., the beacon fingerprint 103) observed by a requesting computing device, such as the mobile computing device 102. In some embodiments, the positioning service 104 obtains or otherwise accesses a beacon position for each of the beacons 101 in the received beacon fingerprint 103, and further obtains or otherwise accesses a minimum beacon radius for each of the obtained beacon positions to achieve a pre-defined confidence level. The inferred beacon positions and associated minimum beacon radiuses may be computed prior to receiving the beacon fingerprint 103.

In other embodiments, such as at 604, the positioning service 104 infers, from the training positioned observations, a beacon position for each of the beacons 101 in the received beacon fingerprint 103 responsive to receipt of the beacon fingerprint 103. For each of the inferred beacon positions, the positioning service 104 further estimates a minimum beacon radius to achieve a pre-defined confidence level. The minimum beacon radius for each beacon 101 is estimated by, for example, comparing the inferred beacon positions with the test positioned observations. In some embodiments, the positioning service 104 generates an error distance histogram at 606 based on the comparison of the distances between the inferred beacon positions and data from the test positioned observations. For example, the positioning service 104 calculates the error distance histogram. The positioning service 104 selects the minimum beacon radius for each beacon 101 from the generated error distance histogram. The minimum beacon radius for each beacon 101 is selected, for example, as a function of the pre-defined confidence level and an observation count for the beacon 101 from the training positioned observations.

At 608, the positioning service 104 applies a Kalman filter inference algorithm to one or more of the beacons 101 from the beacon fingerprint 103 (e.g., using the inferred beacon positions and the estimated minimum beacon radiuses for those beacons 101) to produce an inferred device position and associated device error radius. At 610, the positioning service 104 adjusts the device error radius as a function of a quantity of the beacons 101 used as input to the Kalman filter to achieve the pre-defined confidence level.

Figure 7:
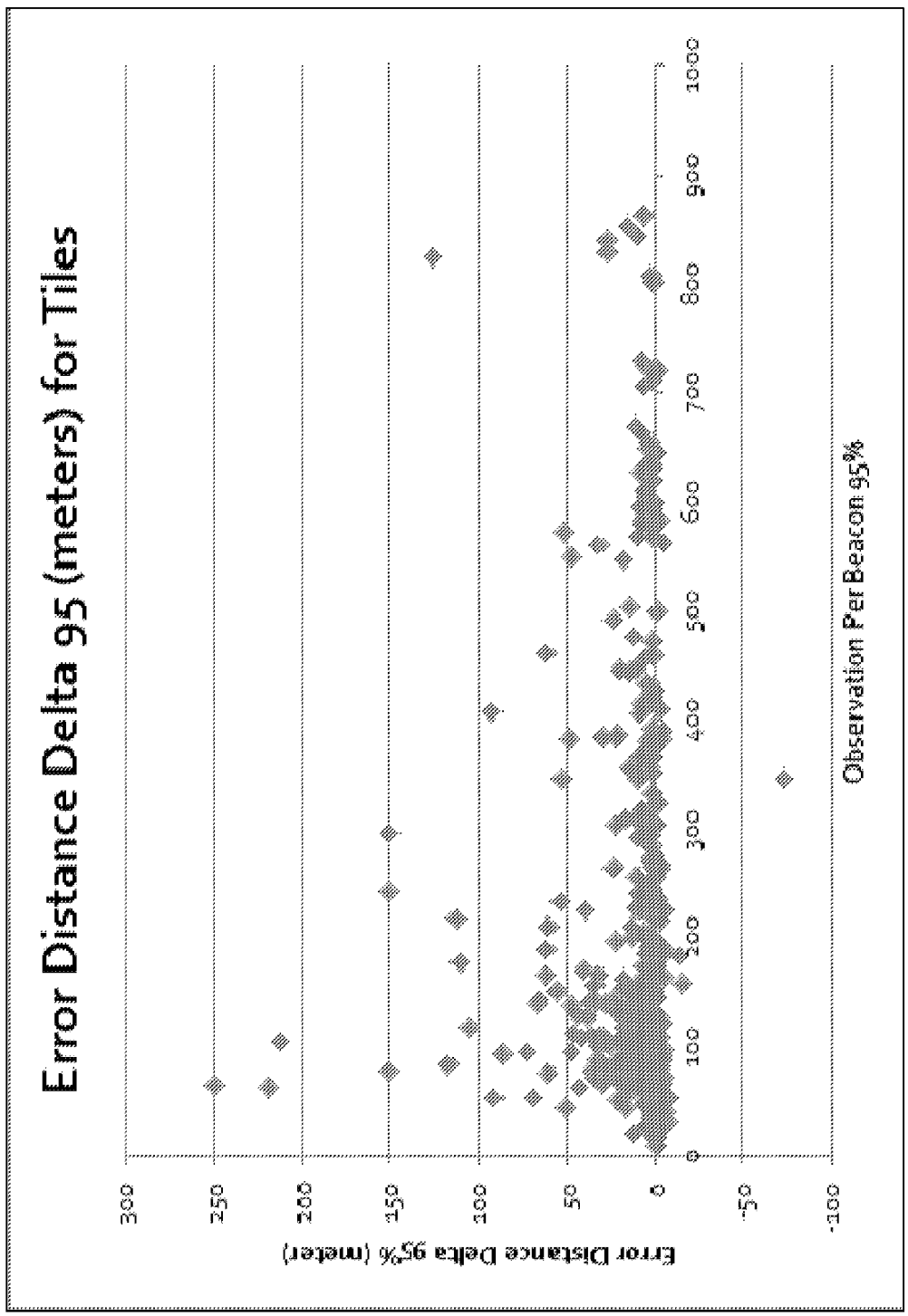
FIG. 7 is an exemplary graph illustrating differences in error distances output the operations illustrated in FIG. 3 versus other positioning methods.

Referring next to FIG. 7, an exemplary graph illustrates differences in error distances output the operations illustrated in FIG. 3 and/or FIG. 6 versus other positioning methods. The error radius output from applying the Kalman filter as described herein may range from 50 meters to 500 meters, in some embodiments, depending at least on how many beacons 101 are used for inferring beacon positions. The error radius estimates are generated from error distances (e.g., comparing the test positioned observations against true positions).

In FIG. 7, the y-axis compares output from applying the Kalman filter as described herein with output from another positioning method, per tile. Each point in the graph is a tile, and each tile represents a geographic area. Points with positive values indicate that the Kalman filter as described herein performed better than the other positioning method. The x-axis represents beacon observation density. As shown in FIG. 7, the higher the density, the better the performance of embodiments of the disclosure.

In addition, aspects of the disclosure improve error radius and error distance. For example, the error radius at the 95% confidence level from application of the Kalman filter as described herein may be reduced to about 75% of the error radius from other positioning methods. Application of the Kalman filter as described herein also reduces the error distance at the 95% confidence level relative to other positioning methods.

ADDITIONAL EXAMPLES

In some embodiments, the mobile computing device 102 performs one or more of the operations illustrated in FIG. 3 and/or FIG. 6. In such embodiments, the mobile computing device 102 may store cached beacon reference data 305 and periodically (or on demand) receive the coefficient values. In this manner, the device error radius is adjusted on the mobile computing device 102 rather than by the positioning service 104.

At least a portion of the functionality of the various elements in FIG. 1, FIG. 2, and FIG. 5 may be performed by other elements in FIG. 1, FIG. 2, and/or FIG. 5, or an entity (e.g., processor, web service, server, application program, computing device, etc.) not shown in FIG. 1, FIG. 2, or FIG. 5.

In some embodiments, the operations illustrated in FIG. 3 and FIG. 6 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While no personally identifiable information is tracked by aspects of the disclosure, embodiments have been described with reference to data monitored and/or collected from users. In such embodiments, notice is provided to the users of the collection of the data (e.g., via a dialog box or preference setting) and users are given the opportunity to give or deny consent for the monitoring and/or collection. The consent may take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, exclude propagated data signals, and are mutually exclusive to communication media. In some embodiments, computer storage media are implemented in hardware. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Such systems or devices may accept input from the user in any way, including from input devices such as a keyboard or pointing device, via gesture input, and/or via voice input.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for pre-processing data input to the Kalman filter and post-processing data output from the Kalman filter to affect the computed device error radius.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for adjusting computed device error radiuses associated with inferred device positions, said system comprising:

a memory area storing a plurality of positioned observations including at least a set of beacons observed by one of a plurality of computing devices, the memory area further storing a plurality of beacon positions inferred from the set of beacons and storing a plurality of minimum beacon radiuses achieving a pre-defined confidence level, the predefined confidence level providing a percentage threshold that the set of beacons are within the minimum beacon radiuses, the plurality of minimum beacon radiuses being estimated by comparing the inferred beacon positions with the stored positioned observations positioned observations; and a processor programmed to:
receive data representing a set of beacons from a mobile computing device, said beacons being observed by the mobile computing device;
obtain, from the plurality of inferred beacon positions stored in the memory area, a beacon position for each of the beacons in the set of beacons in the received data;
for each of the obtained, inferred beacon positions, obtain a minimum beacon radius from the plurality of minimum beacon radiuses stored in the memory area to achieve the pre-defined confidence level;
apply a Kalman filter to one or more of the beacons observed by the mobile computing device using the inferred beacon positions and the obtained minimum beacon radiuses for said one or more of the beacons, wherein applying the Kalman filter infers a device position for the mobile computing device and computes a device error radius for the inferred device position; and
adjust the computed device error radius as a function of a quantity of said one or more of the beacons input to the Kalman filter to achieve the pre-defined confidence level, wherein the device error radius comprises a radius size that enables the computing device to be located within the device error radius under the pre-defined confidence level.

2. The system of claim 1, wherein the processor is further programmed to compare the inferred beacon positions with test positioned observations by calculating a distance therebetween.

3. The system of claim 2, wherein the processor is further programmed to estimate the minimum beacon radius for one of the beacons in the received data by generating an error distance histogram based on the comparison between the inferred beacon position and the test positioned observations.

4. The system of claim 3, wherein the processor is further programmed to select the minimum beacon radius from the generated error distance histogram as a function of observation counts for the one of the beacons and the pre-defined confidence level, the observation counts being stored in the memory area, an observation count being a quantity of times the one of the beacons at the minimum beacon radius satisfies the pre-defined confidence level.

5. The system of claim 3, wherein the processor is further programmed to filter the beacons from the set of beacons in the received data by removing correlated beacons, the correlated beacons having substantially the same inferred beacon positions.

6. The system of claim 1, wherein the pre-defined confidence level represents a percentage within a circle having the adjusted, computed device error radius.

7. The system of claim 1, wherein the processor is further programmed to filter the set of beacons to remove correlated beacons.

8. A method comprising:
receiving, by a processing device, data representing a set of beacons from a computing device, said beacons being observed by the computing device;
accessing, by the processing device, beacon reference data to access an inferred beacon position for the beacons in the set of beacons and to access a minimum beacon radius for the inferred beacon positions to achieve a pre-defined confidence level;
applying, by the processing device, a Kalman filter to one or more of the beacons using the inferred beacon positions and the minimum beacon radiuses for said one or more of the beacons, wherein applying the Kalman filter infers a device position for the computing device and computes a device error radius for the inferred device position; and
adjusting, by the processing device, the computed device error radius as a function of a quantity of said one or more of the beacons input to the Kalman filter to achieve the pre-defined confidence level, wherein the device error radius comprises a radius size that enables the computing device to be located within the device error radius under the pre-defined confidence level.

9. The method of claim 8, wherein adjusting the computed device error radius comprises accessing an error radius adjustment coefficient table.

10. The method of claim 8, wherein adjusting the computed device error radius comprises selecting an adjustment coefficient value as a function of a quantity of said one or more of the beacons input to the Kalman filter.

11. The method of claim 10, further comprising applying the selected adjustment coefficient value to the computed device error radius.

12. The method of claim 10, further comprising computing a plurality of the adjustment coefficient values from the beacon reference data by:
partitioning the beacon reference data into a training dataset and a test dataset;
constructing a beacon model for the beacons in the set of beacons using the training dataset; and
comparing the test dataset against the constructed beacon models.

13. The method of claim 12, wherein constructing the beacon models comprises inferring the beacon position for the beacons in the set of beacons.

14. The method of claim 8, further comprising filtering the set of beacons to remove correlated beacons.

15. The method of claim 8, wherein receiving the data comprises receiving, by a positioning service, the data from an observing computing device.

16. The method of claim 8, wherein the receiving, the accessing, the applying, and the adjusting are performed by one or more of the following: a mobile computing device and a cloud service.

17. One or more computer storage media embodying computer-executable components, said components comprising:
an interface component that when executed causes at least one processor to receive data representing a set of beacons from a computing device, said beacons being observed by the computing device;
a beacon store component that when executed causes at least one processor to access beacon reference data to infer a beacon position for each of the beacons in the set of beacons;
a beacon radius component that when executed causes at least one processor to determine a minimum beacon radius for the inferred beacon positions to achieve a pre-defined confidence level;
a refiner component that when executed causes at least one processor to apply a Kalman filter to one or more of the beacons using the inferred beacon positions and the determined minimum beacon radiuses for said one or more of the beacons, wherein applying the Kalman filter infers a device position for the computing device and computes a device error radius for the inferred device position; and a coefficient component that when executed causes at least one processor to adjust the computed device error radius as a function of a quantity of said one or more of the beacons input to the Kalman filter to achieve the pre-defined confidence level, wherein the interface component further executes to provide the inferred device position and the adjusted, computed device error radius to the computing device, wherein the device error radius comprises a radius size that enables the computing device to be located within the device error radius under the pre-defined confidence level.

18. The computer storage media of claim 17, wherein the pre-defined confidence level corresponds to an in-circle percentage.

19. The computer storage media of claim 17, wherein the refiner component further filters the set of beacons to remove correlated beacons having substantially the same inferred beacon positions.

20. The computer storage media of claim 17, wherein the coefficient component adjusts the computed device error radius by multiplying the computed device error radius by a coefficient value selected as a function of the quantity of said one or more of the beacons input to the Kalman filter.

* * * * *